W. E. PEDRICK.
MECHANISM FOR FEEDING SHEETS, PAMPHLETS, OR ANALOGOUS ARTICLES.
APPLICATION FILED NOV. 11, 1916.
1,292,641. Patented Jan. 28, 1919.
4 SHEETS—SHEET 1.
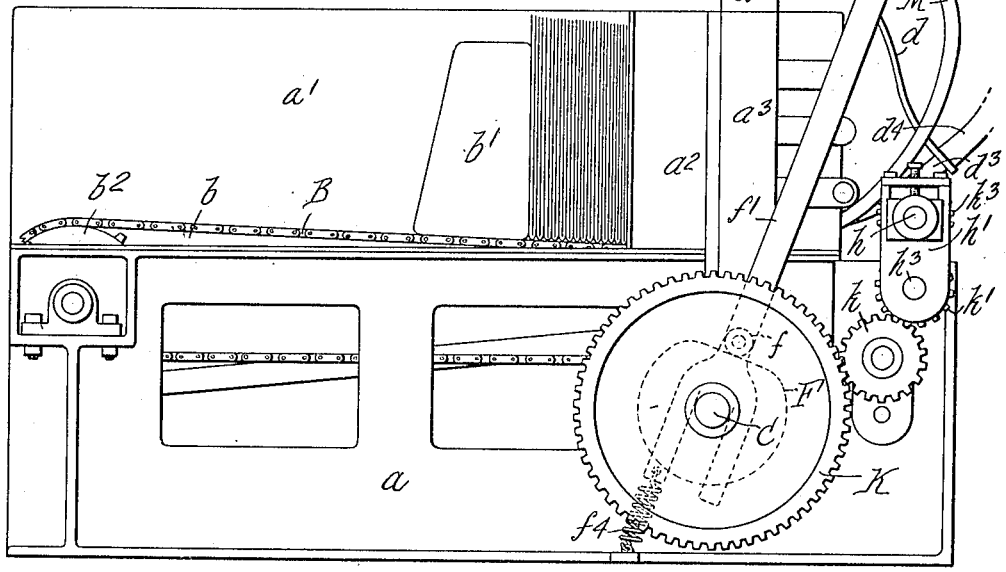
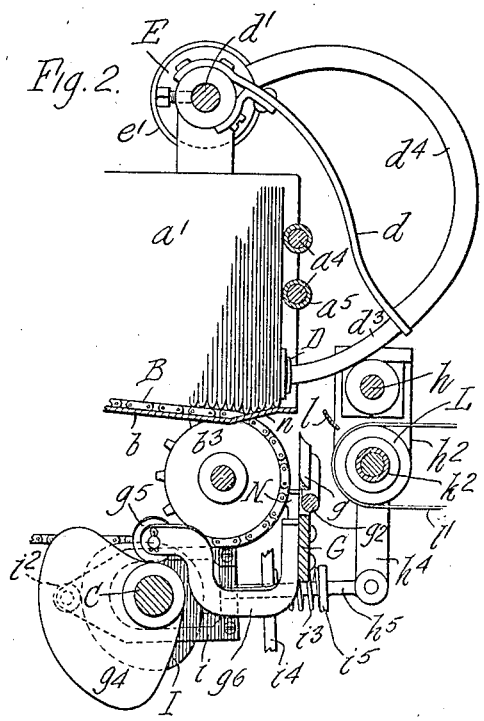
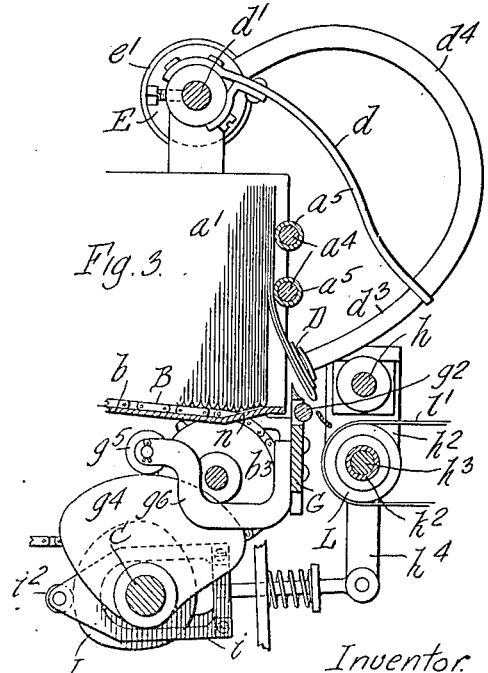
Inventor.
William E. Pedrick,
by Wilhelm & Parker.
Attorneys.

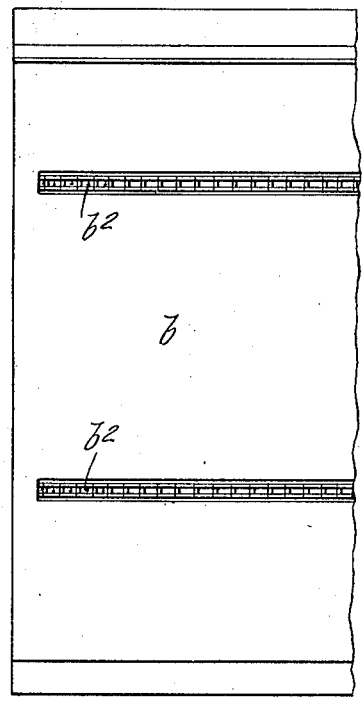

W. E. PEDRICK.
MECHANISM FOR FEEDING SHEETS, PAMPHLETS, OR ANALOGOUS ARTICLES.
APPLICATION FILED NOV. 11, 1916.

1,292,641.

Patented Jan. 28, 1919.

Inventor.
William E. Pedrick
by Wilhelm & Parker.
Attorneys.

W. E. PEDRICK.
MECHANISM FOR FEEDING SHEETS, PAMPHLETS, OR ANALOGOUS ARTICLES.
APPLICATION FILED NOV. 11, 1916.

1,292,641.

Patented Jan. 28, 1919.

Inventor.
William E. Pedrick,
By Wilhelm & Parker
Attorneys.

UNITED STATES PATENT OFFICE.

WILLIAM E. PEDRICK, OF BUFFALO, NEW YORK, ASSIGNOR TO LARKIN CO., OF BUFFALO, NEW YORK.

MECHANISM FOR FEEDING SHEETS, PAMPHLETS, OR ANALOGOUS ARTICLES.

1,292,641. Specification of Letters Patent. Patented Jan. 28, 1919.

Application filed November 11, 1916. Serial No. 130,792.

*To all whom it may concern:*

Be it known that I, WILLIAM E. PEDRICK, a citizen of the United States, residing at Buffalo, in the county of Erie and State of New York, have invented a new and useful Improvement in Mechanisms for Feeding Sheets, Pamphlets, or Analogous Articles, of which the following is a specification.

This invention relates to mechanisms for removing articles, such as sheets, cards, pamphlets, catalogues, envelops or the like, one at a time from a stack or pile.

One object of the invention is to produce an apparatus of this kind which is provided with means of improved construction for positively insuring the removal of only one article at a time from the stack of articles. This is accomplished, in the construction shown, by providing a suction device acting on one corner of the article to be removed and a movable separating member which enters between the separated corner of the article and the remainder of the stack and separates one edge of the article from the stack. The article is then withdrawn from the stack by rollers which coöperate with the separating member.

Another object of the invention is to improve the means for moving the articles of the stack into operative relation to the feeding means.

The invention also aims to produce means of improved construction for pushing or positively moving the foremost articles of the stack backwardly into proper position in case they advance beyond this position; also to improve the construction of mechanisms of this kind in other respects hereinafter specified.

In the accompanying drawings:

Figure 1 is a side elevation of an article feeding mechanism embodying the invention.

Figs. 2 and 3 are fragmentary sectional elevations thereof on line 2—2, Fig. 4, showing the parts in different positions.

Fig. 4 is a top plan view thereof.

Fig. 5 is a fragmentary sectional elevation thereof on line 2—2, Fig. 4, showing another position of the parts of the mechanism.

Fig. 6 is a fragmentary sectional elevation on line 6—6, Fig. 4.

Fig. 7 is a sectional view of the suction device.

Figure 8:
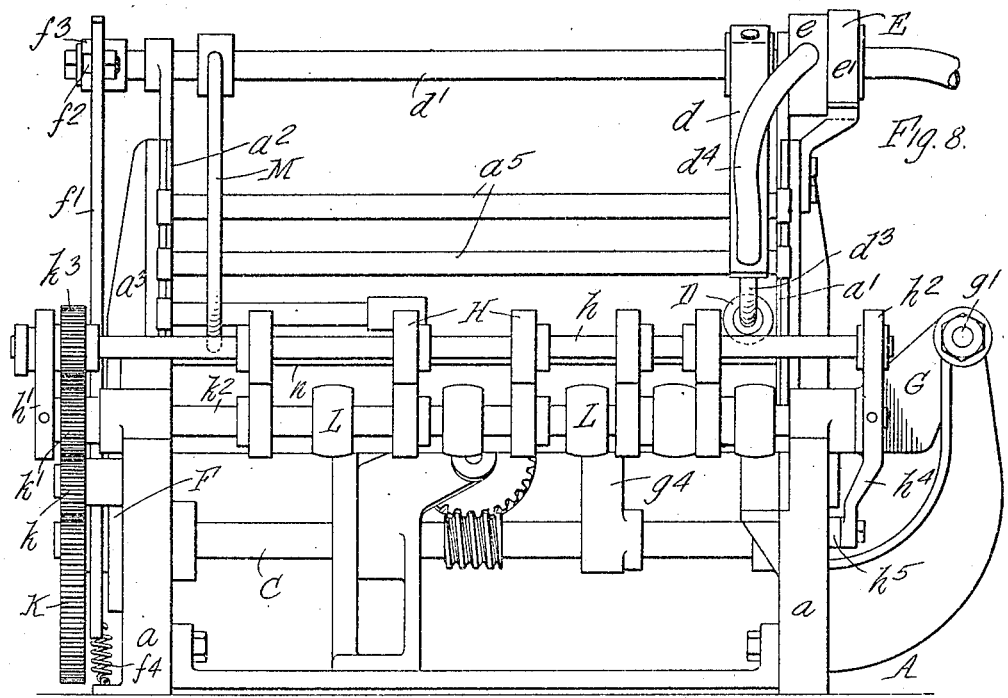
Fig. 8 is a front elevation of the sheet feeding mechanism embodying the invention.
Figure 9:
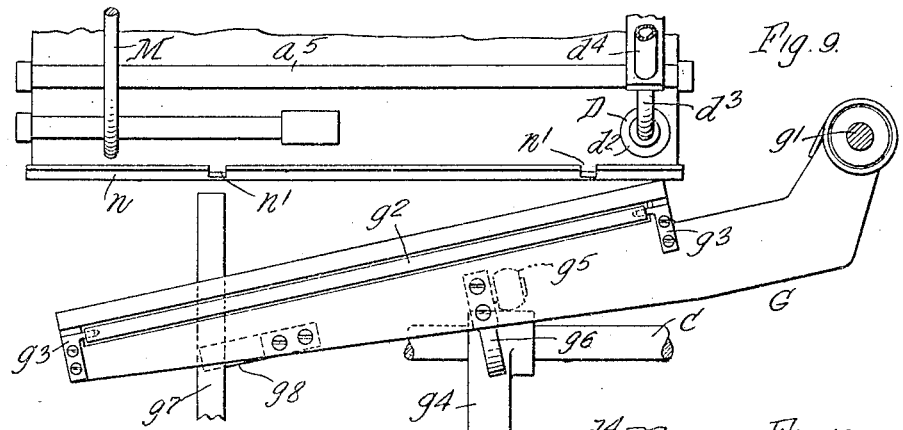
Figs. 9 and 10 are fragmentary front elevations thereof showing the separating member of the apparatus in different positions.
Figure 10:
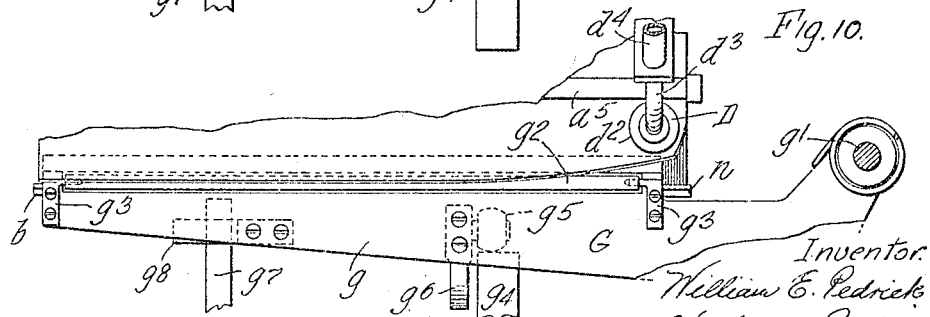
Figure 11:
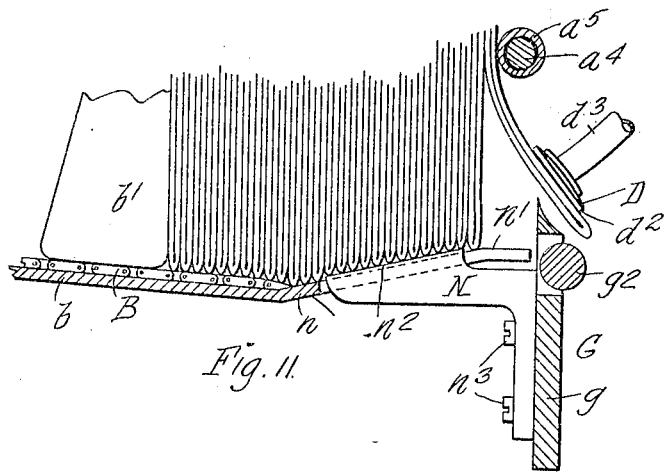
Figs. 11 and 12 are fragmentary sectional elevations on an enlarged scale on line 11—11, Fig. 4, showing the parts in different positions.
Figure 12:
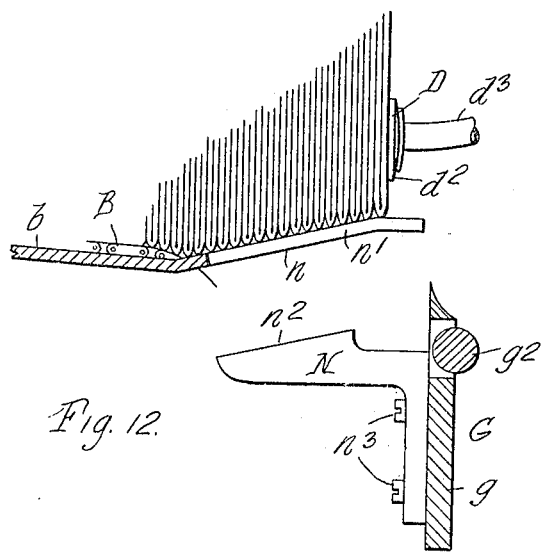

A represents the frame of the apparatus on which the several parts of the mechanism are mounted and on which the stack of articles which are to be fed can be placed. The frame includes legs or supports $a$ extending substantially throughout the length of the table, a side wall $a'$ which acts as a guide against which the edges of the article can be placed for alining the stack articles on the frame. The other side of the frame is provided at its front portion with a shield or deflector $a^2$ which is secured on an upwardly extending portion $a^3$ of the frame and which insures the proper feeding of the articles to the front portion of the apparatus. The front end of the frame of the apparatus is provided with rods $a^4$ extending across the frame at the front end thereof to limit the forward movement of the articles on the table. Anti-friction rollers $a^5$ are mounted on the rods to facilitate the removal of the articles one at a time from the stack. A frame of any other suitable construction may be employed.

The articles to be fed may be moved toward the front end of the apparatus by any suitable means. In the construction shown, sprocket chains B are provided which are arranged to move over a table portion $b$ of the frame of the apparatus so that the stack of articles may rest directly upon the chains. A follower block $b'$ rests loosely on the chains and holds the articles in the stack in a substantially upright position. The chains are driven in such a manner that the upper runs thereof move toward the front end of the apparatus and thus yieldingly press the articles against the anti-friction rollers $a^5$ at the front end of the frame. The chains engage with sprocket wheels $b^2$ $b^3$ arranged at the rear and front portions of the frame of the apparatus and may be driven from the drive shaft C of the apparatus in any suitable manner, such, for example, as is shown in my co-pending application No. 39,798, filed July 14, 1915.

In order to remove the articles one at a time from the stack of articles on the frame of the apparatus, one corner of the first or foremost article of the stack is engaged by a suction device which bends or draws this corner outwardly from the next article of the stack to permit the insertion of a separating device or member between the two articles. The separating member after being inserted between the corner of the first article and the remainder of the stack is moved between the first article and the stack in such a way as to separate the adjacent edge of the article from the stack. For this purpose, in the construction shown, a suction device D is provided which is mounted on an arm $d$ secured on a rock shaft $d'$ suitably mounted on the frame of the machine. The movement of the rock shaft $d'$ causes the suction device D to move into engagement with the first article of the stack and then to withdraw one corner of the article. The suction device D may be of any suitable construction, that shown comprising a flexible or elastic suction cup $d^2$ connected with a tube $d^3$ secured on the arm $d$. The tube $d^3$ is connected with a suitable suction tube $d^4$ which is preferably flexible and which connects with the movable member $e$ of a suction controlling valve E. This valve may be of any suitable or well known construction and is provided with ports (not shown) in the movable member $e$ and in a fixed member $e'$ of the valve, which are opened and closed by the oscillation of the shaft $d'$, in such a manner that the suction will be applied to the suction device D when the same is in the position shown in Fig. 2, and will be broken when the suction device is in the position shown in Fig. 5. Any other means for controlling the suction in the suction device D may be employed if desired.

The oscillation of the shaft $d'$, in the construction shown, is accomplished by means of a cam F mounted on the drive shaft C. The cam engages a roller $f$ secured on a reciprocatory arm $f'$, one end of which is pivoted at $f^2$ to a rock arm $f^3$ extending outwardly from the rock shaft $d'$, and the other end of the reciprocatory arm $f'$ is bifurcated, straddling the drive shaft C. A tension spring $f^4$ connected at opposite ends with the reciprocatory arm and with the frame of the apparatus serves to hold the roller $f$ in engagement with the face of the cam F. Any other means for actuating the suction device may be employed if desired.

After the corner of the foremost article has been drawn out by means of the suction device, a separating device or member G is inserted between the separated corner of the article and the remainder of the stack. This separating member may be of any suitable construction, that shown comprising a blade $g$ having its upper edge beveled so as to separate the edges of adjacent articles when moved between the same. The separating member, in the construction shown, is normally in a position below the articles and is pivoted at $g'$ in such a manner that a portion of the separating device, for example, a corner thereof near the pivot, can enter between the separated corner of the first article and the remainder of the stack. As the separating device is swung upwardly about its pivot, the upper edge of the blade $g$ thereof is moved between the lower edge of the foremost article and the remainder of the stack in such a manner as to remove the lower edge of the foremost article from the next article. The separating member is preferably provided adjacent to its beveled edge with an idler roll $g^2$ suitably pivoted on brackets or extensions $g^3$ secured on the separating device in such a manner that the roll bears against the article to be removed when the separating member is in its upper or separating position.

The separating member may be actuated in any suitable manner, a cam $g^4$ mounted on the drive shaft C being employed in the construction shown. This cam engages an anti-friction roller $g^5$ mounted on an arm $g^6$ secured to the separating member G. Suitable guide means are preferably provided for guiding the separating blade in its movement, for example, an upright rod $g^7$ may be provided which engages the separating blade and a cleat $g^8$ mounted thereon, to hold the separating member in proper relation to the stack of articles. In the construction shown, the separating member is arranged at the lower side of the articles, and the lower edge of the foremost article is separated from the stack but, if desired, the position of the stack of articles may be altered and the suction device and separating member may, if desired, be arranged to separate a side of the article other than the lower side.

By means of the mechanism described the suction device separates one corner of the first article from the stack and the separating blade separates the remainder of one of the edges of the article from the stack. Means are provided for engaging the separated edge of the article and withdrawing the article from the stack while the separating member is in its upper or separating position. In the construction shown for this purpose, one or more driven feed rolls H having peripheral friction faces are moved into engagement with the outer face of the article and press the article against the idler roll $g^2$ of the separating member so as to draw the foremost article by the rotation of the rolls between the anti-friction rolls $a^5$ and the next article of the stack. The rolls in the construction shown are mounted upon a shaft $h$ journaled at its opposite ends in arms or links $h'$ $h^2$ secured on a rock shaft $h^3$ which is adapted to oscillate to cause the rolls H to move into and out of operative relation to the idler roll $g^2$ of the separating member. The rock shaft $h^3$ is oscillated by means of a downwardly extending arm $h^4$ pivoted to a connecting rod $h^5$ which is actuated by any suitable means, such as a cam I. In the construction shown, the end of the connecting rod $h^5$ is secured to a yoke member $i$ which straddles a hub $i'$ of the cam member for guiding the connecting rod $h^5$ in its movement. The yoke member $i$ is provided with an anti-friction roller $i^2$ which rides on the periphery of the cam I and a spring $i^3$ arranged between a fixed part $i^4$ of the supporting frame of the mechanism and a shoulder $i^5$ on the connecting member, yieldingly holds the anti-friction roller in engagement with the face of the cam I. The cam and the connecting rod are so arranged that the arms $h'$ $h^2$ will be swung about the rock shaft $h^3$ to move the rolls H into engagement with the idler roll $g^2$ at about the time or immediately after the suction is released from the suction device D, so that the article is pressed between the rolls H and $g^2$ and is removed from the stack by the rotation of the rolls H.

The rotation of the rolls H may be effected in any suitable manner, for example, by means of a gear K, Fig. 1, mounted on the drive shaft C and meshing with an idler gear $k$ suitably journaled on the frame of the apparatus. The idler gear $k$ meshes with a gear $k'$ secured on a sleeve $k^2$, Figs. 2, 3 and 6 rotatably mounted on the rock shaft $h^3$, and the gear $k'$ in turn meshes with a gear $k^3$ secured on the shaft $h$. Other means may be employed if desired for rotating the rolls H. The rolls H and $g^2$ draw the article downwardly out of the stack and the lower edge of the article engages a deflector $l$ which turns the article forwardly and causes the same to pass between the rolls H mounted on the shaft $h$ and rolls L secured on the rotatable sleeve $k^2$. The rolls L may be provided with feed belts $l'$ for feeding the article forwardly to suitable devices (not shown) for receiving the articles.

When articles such as pamphlets and catalogues are fed by the mechanism, these articles are placed on the supporting chains B in such a manner that the bound edges thereof rest on the chains. As the stack is pushed forwardly against the anti-friction rollers $a^5$ by means of the feed chains, the lower edges of the articles have a tendency to move forwardly beyond the upper edges of the articles. In order to positively move the lower portions of the articles back into their proper positions, the rock shaft $d'$ is preferably provided with an arm or member M rigidly secured thereto and extending toward the lower edge of the articles at a distance from the suction device, preferably adjacent to the opposite corners of the articles. The arm M is so formed that the oscillation of the rock shaft moves the arm into engagement with any article that may have moved forwardly beyond their proper positions and to push the same into their proper positions when the suction device moves into engagement therewith. This positively insures the foremost article being in the proper position to be operated upon by the separating member after the corner of the article has been drawn out by the suction device.

In order to prevent the lower or folded edges of the article from "fanning out" or advancing beyond the upper portions thereof, it is desirable to provide means for holding back the lower portions of the articles until they are withdrawn by means of the suction device and the separating member. For this purpose the base or table portion $b$ of the supporting frame of the apparatus is provided with an inclined portion $n$ arranged beyond the front ends of the chains B, which resists the forward movement of the articles beyond the chains. In order to raise the articles in such a way as to permit them to pass over the inclined portion $n$ of the table, the separating member is provided with brackets N which are arranged to project through slots $n'$ in the table and which have inclined upper faces $n^2$ adapted to engage the lower edges of the articles through the slots $n'$. The movement of the brackets N above the table $b$ is just sufficient to raise the articles on the inclined portion $n$ of the table to a sufficient extent to permit them to pass forwardly or advance slightly over the inclined portion of the table. The travel of the brackets above the table is preferably, though not necessarily, so arranged as to raise the articles just enough to permit them to advance a distance substantially equal to the thickness of one of the articles of the stack. In this manner the articles are raised step by step until they reach the upper edge of the inclined portion $n$ of the table. By means of this structure the inclined portion $n$ of the table positively prevents the rear articles of the stack from forcing the foremost articles out of their proper positions, and the proper feeding of the articles is insured by the positively movable brackets N. In case it is desired to dispense with the brackets N, these brackets can be disconnected from the separating member by removing screws $n^3$. The inclined portion $n$ may be roughened, serrated, or corrugated to resist the outward movement of the articles.

The apparatus described is capable of operating on single sheets, cards, bound or folded articles, and positively insures the proper feeding of the articles one at a time from the apparatus. The suction device is not depended upon to withdraw articles from the stack but merely to bend one corner of the foremost article outwardly from the stack, and the actual withdrawing of the articles is accomplished by means of driven friction rolls, thereby making the apparatus positive in its operation.

I claim as my invention:

1. In an article feed mechanism, the combination of a support for a stack of articles, means adapted to engage one corner of the first article of the stack for moving the corner of the article outwardly from the stack, a separating device, means for first inserting one portion of said device between said corner of the first article and the stack and for moving other portions of said device between said first article and said stack to separate one edge of the first article from said stack, and means coöperating with said separating device for withdrawing said article from the stack.

2. In an article feed mechanism, the combination of a support for a stack of articles, movable suction means adapted to engage one corner of the first article of the stack for withdrawing the corner of the article from the stack, a separating device, means for first inserting one portion of said device between said corner of the first article and the stack and for moving other portions of said device between said first article and said stack to separate one edge of the first article from said stack, and means coöperating with said separating device for withdrawing said article from the stack.

3. In an article feed mechanism, the combination of a support for a stack of articles, means adapted to engage one corner of the first article of the stack for moving the corner of the article outwardly from the stack, a separating device, means for first inserting one portion of said device between said corner of the first article and the stack and for then moving other portions of said device between said first article and said stack to separate one entire edge of the first article from said stack, and a feed roll for engaging said separated edge of the article and withdrawing the same from said stack.

4. In an article feed mechanism, the combination of a support for a stack of articles, means adapted to engage one corner of the first article of the stack for moving the corner of the article outwardly from the stack, a separating device including a roll, means for inserting said separating device first between said corner of the first article and the stack and for then moving said device between said first article and said stack for separating one entire edge of the first article from said stack, and feed rolls for coöperating with said roll to engage the separated edge of said first article and withdraw the article from said stack.

5. In an article feed mechanism, the combination of a support for a stack of articles, means adapted to engage one corner of the first article of the stack for moving the corner of the article outwardly from the stack, a separating device pivoted at one side of said stack of articles, means for swinging said separating device about its pivot to first insert a portion thereof between said corner of the first article and said stack and then to move other portions of said separating device between an edge of said first article and said stack, and means adapted to engage said separated edge of said first article for withdrawing said article from said stack.

6. In an article feed mechanism, the combination of a support for a stack of articles, means adapted to engage one corner of the first article of the stack for moving the corner of the article outwardly from the stack, a separating device including a roll, means for inserting said separating device between said corner of the first article and the stack and for moving said device between said first article and said stack for separating one edge of the first article from said stack, a rotary feed roll adapted to engage the outer face of the first article, and means for moving said feed roll into engagement with said article and into operative relation to said roll of the separating device to remove the article from the stack.

7. In an article feed mechanism, the combination of a support for a stack of articles, means adapted to engage one corner of the first article of the stack for moving the corner of the article outwardly from the stack, a separating device including an idler roll, means for inserting said separating device and idler roll between said corner of the first article and the stack and for moving said device between said first article and the stack for separating one edge of the first article from said stack and for placing said idler roll into contact with the inner face of the article, a driven rotary feed roll, and means for moving said feed roll into engagement with the outer face of the article and into a position to press said article against said idler roll for removing the article from the stack.

8. In an article feed mechanism, the combination of a support for a stack of articles, means adapted to engage one corner of the first article of the stack for moving the corner of the article outwardly from the stack, a separating device comprising a blade pivoted at one side of said stack of articles, a part of said blade being adapted to enter between said corner of the foremost article and the stack and other parts of the blade being adapted to engage an edge of the article and separate the same from the stack, and feed rolls adapted to engage said edge of the article to remove the article from the stack.

9. In an article feed mechanism, the combination of a support for a stack of articles, means adapted to engage one corner of the first article of the stack for moving the corner of the article outwardly from the stack, a separating device comprising a blade pivoted at one side of said stack of articles, a part of said blade being adapted to enter between said corner of the foremost article and the stack and other parts of the blade being adapted to engage an edge of said article and separate the same from the stack, a roll mounted on said blade and adapted to engage a portion of said article which has been separated from the stack, and a feed roll adapted to coöperate with said roll on the blade to withdraw said article from the stack.

10. In a feed mechanism, the combination of a support for a stack of articles, a suction device adapted to engage a corner of the foremost article of the stack and separate the same from the remainder of the stack, means for moving said suction device toward and from said stack, and a push member actuated by said means to engage the foremost article of the stack to push the same into proper position to be taken from the stack.

11. In a feed mechanism, the combination of a support for a stack of articles, one edge of each of said articles resting on said support, means engaging said edges of the articles for moving the same to the front end of said mechanism, a suction device adapted to engage one corner of the foremost article adjacent to said edge and separate said corner from the remainder of the stack, and means for engaging the foremost article adjacent to said edge to push the edge portion of said article into proper position to be taken from the stack.

12. In a feed mechanism, the combination of a support for a stack of articles, one edge of each of said articles resting on said support, means engaging said edges of the articles for moving the same to the front end of said mechanism, a suction device adapted to engage one corner of the foremost article adjacent to said edge and separate said corner from the remainder of the stack, means for moving said suction device toward and from said stack, and means actuated by said moving means for engaging the foremost article near said edge thereof to push the article toward the stack into proper position to be taken from the stack.

13. In a feed mechanism, the combination of a support for a stack of articles, means for advancing said stack to place the foremost article thereof into position to be fed from the stack, a suction device adapted to engage a corner of the foremost article of the stack and to separate the same from the remainder of the stack, a rock shaft in which said suction device is mounted, and an arm mounted on said rock shaft and adapted to engage the foremost article of the stack and to push the same toward said stack into proper feeding position.

14. In a feed mechanism, the combination of a support for a stack of articles, including a table on which the articles are supported, means for feeding the articles forwardly on said table, said articles being supported in a substantially upright position on said table, said table having an upwardly inclined portion near the front end thereof on which several of said articles rest at one time and which retards their forward movement, means for feeding said articles one at a time from the forward end of said stack and means for engaging said several articles and gradually raising the same over this inclined portion.

15. In a feed mechanism, the combination of a support for a stack of articles including a table on which the articles are supported in an upright position, a chain engaging the lower edges of said articles for feeding said articles toward the front end of said table, an upwardly inclined portion at the forward end of said table which retards the forward movement of the lower edges of said articles, means for moving the articles located adjacent to the foremost article upwardly to cause said articles to pass over said inclined portion of the table, and means for removing the articles one at a time from the front portion of the stack.

16. In a feed mechanism, the combination of a support for a stack of articles including a table on which the articles are supported in an upright position, means for feeding said articles toward the front end of said table, means at the forward end of said table which retards the forward movement of the lower edges of said articles, means for removing the articles one at a time from the front portion of said stack, and means for raising the foremost articles step by step to move the same out of engagement with said retarding means to enable the articles to advance toward the front of the stack.

17. In a feed mechanism, the combination of a support for a stack of articles including a table on which the articles are supported in an upright position, a chain engaging the lower edges of said articles for feeding said articles toward the front end of said table, an upwardly inclined portion at the forward end of said table which retards the forward movement of the lower edges of said articles, means for removing the articles one at a time from the front portion of said stack, and means for raising the articles located adjacent to the foremost article step by step to enable the articles to advance toward the front of the stack.

18. In a feed mechanism, the combination of a support for a stack of articles including a table on which the articles are supported in an upright position, a chain engaging the lower edges of said articles for feeding said articles toward the front end of said table, an upwardly inclined portion at the forward end of said table which retards the forward movement of the lower edges of said articles, means for removing the articles one at a time from the front portion of said stack including a separating member for separating the lower edge of the foremost article from the remainder of the stack, and means actuated by said separating member for raising the articles located adjacent to said foremost article step by step to enable the articles to advance toward the front of said stack.

19. In feed mechanism, the combination of a support for a stack of articles including a table on which the articles are supported in an upright position, a chain engaging the lower edges of said articles for feeding said articles toward the front end of said table, an upwardly inclined portion at the forward end of said table which retards the forward movement of the lower edges of said articles, means for removing the articles one at a time from the front portion of said stack including a separating member for separating the lower edge of the foremost article from the remainder of the stack, and brackets secured to said separating member and adapted to pass through slots in said table to raise the articles on said inclined portion of the table step by step to enable the articles to advance toward the front of said stack.

20. In a feeding mechanism, the combination of a support for a stack of articles, means for moving an edge portion of the first article away from the stack, a separating device pivoted at one side of the stack of articles and adapted to swing about its pivot between said edge of the first article and the remainder of the stack, and feed rolls movable into operative relation to said separating device when the separating device has been inserted between said edge and said stack for removing the article from the stack.

21. In a feeding mechanism, the combination of a support for a stack of articles, means for moving a portion of the first article away from the stack, a separating device movable between said first article and the stack, said separating device being arranged to be inserted first between said portion of the article and the stack and then between an edge of said article and the stack, and means movable into operative relation to said separating device when the same is in its final position between said first article and said stack for removing the article from the stack.

22. In a feeding mechanism, the combination of a support for a stack of articles, means for moving a portion of the first article away from the stack, a separating device movable first at an angle to an edge to separate said portion of the article from the remainder of the stack and then into a position substantially parallel with said edge, and means movable into operative relation to said separating device when the same is in said parallel position for removing the article from the stack.

23. In a feeding mechanism, the combination of a support for a stack of articles, means for moving a portion of the first article away from the stack, a separating device including a roller which is movable at an angle to an edge of said first article to separate said portion thereof from the remainder of the stack, and then movable into a position substantially parallel with said edge to separate said edge, and feed rolls movable into operative relation to said separating device when the same is in said parallel position for removing the article from the stack.

24. In a feeding mechanism, the combination of a support for a stack of articles, means for moving a portion of the first article away from the stack, a separating roll pivoted at one side of said support and movable about its pivot between said portion and the adjacent article to first separate one corner of the first article from the remainder of the stack, and then into a position to separate an edge of the first article from the stack, and feed rolls movable into operative relation to said separating roll when said separating roll has been moved into a position between said edge of the first article and the remainder of the stack.

25. In a feeding mechanism, the combination of a support for a stack of articles, means for moving a portion of the first article away from the stack, a separating roll movable between the separated portion of the first article and the other articles of the stack, said roll moving first at an angle to an edge of the first article and first separating one corner of the first article from the stack, and then moving into a position to separate said entire edge from the remainder of the stack, and means adapted to coöperate with said separating roll when the same is in said last mentioned position for removing the article from the stack when said separating roll takes said last mentioned position.

26. In a feeding mechanism, the combination of a support for a stack of articles, means for moving a portion of the first article of the stack away from the next article, a separating device which is inserted between said portion and the stack, coöperating rolls which engage the opposite faces of the first article to withdraw the same from the stack, one of said rolls being mounted on said separating device and moving in a substantially arc-shaped path into a position substantially parallel with said edge, and means for moving the other roll for gripping said first article against said first mentioned roll when said first mentioned roll is in said parallel position.

27. In a feeding mechanism, the combination with a support for a stack of articles, of means for moving a portion of the first article of the stack away from the adjacent article, a roll which is inserted between said two articles and which enters first between said portion of the first article and the adjacent article and is then moved into a position to separate an entire edge of the first article from the stack, a second roll movable into engagement with the first article and pressing the same against the first mentioned roll when the same has separated said edge from said stack, and means for rotating one of said rolls to remove said first article from the stack.

28. In a feeding mechanism, the combination with a support for a stack of articles, of means for moving a portion of the first article of the stack away from the adjacent article, an idler roll which is inserted between said two articles and which enters first between said portion of the first article and the adjacent article and is then moved into a position to separate an entire edge of the first article from the stack, and a driven roll adapted to engage the first article and press the same against said idler roll when said idler roll has separated said edge from said stack for removing the first article from the stack, and means for moving said driven roll into engagement with said idler roll.

29. In a feeding mechanism, the combination with a stationary support for a stack of articles, of means for moving a portion of the first article of the stack away from the adjacent article, feed rolls, means for moving said rolls into engagement with the opposite faces of the first article to remove the same from the stack, one of said rolls moving about a center located at one side of the stack of articles and separating first said portion of the first article from the stack and then moving into a position to separate the lower edge of the first article from the second article, and means for driving at least one of said rolls.

30. In a feeding mechanism, the combination of a support for a stack of articles, a suction device, means for operating said suction device for moving a portion of an article away from the stack, a separating device, means for swinging said separating device about a center located at one side of the stack to place the separating device first between one corner of the article and the stack and then between an edge and the stack, means for releasing the article from the suction device, and positively operated means for feeding the article from the stack after the separating device is in its final position.

31. In a feeding mechanism, the combination of a support for a stack of articles, means for moving an edge portion of an article away from the stack, a separating device comprising a blade arranged adjacent to said edge of the article and pivoted at one end, means for swinging the blade about a pivot arranged at one side of said stack to cause the blade to enter between said edge and the stack, and means for withdrawing the article from the stack.

32. In a feeding mechanism, the combination of a support for a stack of articles, means for moving an edge portion of an article away from the stack, a separating member adapted to be inserted between said edge and the stack, a pair of feeding-off rolls which are normally in contact and which are movable bodily into a position in which one of said rolls is in engagement with said article for feeding the same from the stack, and cam mechanisms for actuating said separating member and said feeding-off rolls.

Witness my hand, this 9th day of November, 1916.

WILLIAM E. PEDRICK.

Witnesses:
S. E. CLIFT,
FREDERIC W. CLAUS.